US005517392A

United States Patent [19]
Rousso et al.

[11] Patent Number: 5,517,392
[45] Date of Patent: May 14, 1996

[54] SLEEVE RETENTION FOR FLEXIBLE CORE OF A FLASHLIGHT

[75] Inventors: John G. Rousso, Beacon Falls; Paul R. Holbrook, Shelton, both of Conn.

[73] Assignee: Black & Decker Inc., Newark, Del.

[21] Appl. No.: 286,852

[22] Filed: Aug. 5, 1994

[51] Int. Cl.$^6$ .................................................. F21L 15/08
[52] U.S. Cl. ........................ 362/198; 362/194; 362/196; 362/285; 362/421; 439/162
[58] Field of Search ..................................... 439/162, 333, 439/350, 352, 928; 362/194, 195, 196, 197, 198, 199, 226, 285, 421

[56] References Cited

U.S. PATENT DOCUMENTS

| | | | |
|---|---|---|---|
| D. 147,258 | 8/1947 | Becker | D26/43 |
| D. 152,584 | 2/1949 | Becker | D26/43 |
| D. 166,073 | 8/1952 | Dunkelberger | D26/43 |
| D. 190,295 | 5/1961 | Becker et al. | D26/43 |
| D. 192,935 | 5/1962 | Becker et al. | D26/43 |
| D. 240,322 | 6/1976 | Staub | D26/43 |
| D. 268,442 | 3/1983 | Darmon | D26/24 |
| D. 281,820 | 12/1985 | Oba et al. | D26/43 |
| D. 283,645 | 4/1986 | Tanaka et al. | D26/43 |
| D. 302,325 | 7/1989 | Charet et al. | D26/60 |
| D. 304,089 | 10/1989 | Wan | D26/42 |
| D. 306,351 | 2/1990 | Charet et al. | D26/43 |
| D. 314,246 | 1/1991 | Bache | D26/62 |
| D. 321,062 | 10/1991 | Bonbright | D26/140 |
| D. 322,681 | 12/1991 | Yuen | D26/38 |
| D. 328,146 | 7/1992 | Sinsteden | D26/49 |
| D. 329,504 | 9/1992 | Yuen | D26/42 |
| D. 337,839 | 7/1993 | Zeller | D26/43 |
| D. 338,542 | 8/1993 | Yuen | D26/42 |
| D. 341,220 | 11/1993 | Eagan | D26/43 |
| D. 344,602 | 2/1994 | Yuen | D26/42 |
| 599,543 | 2/1898 | Whitaker | 362/413 |
| 642,648 | 2/1900 | Van Duzer | 362/198 |
| 1,108,350 | 8/1914 | Farber | 362/198 |
| 1,232,824 | 7/1917 | Mayhew | 362/202 |
| 1,279,803 | 9/1918 | Watson | 362/414 |
| 1,692,394 | 11/1928 | Sundh | 362/198 |
| 2,427,890 | 9/1945 | White | 34/647 |
| 2,467,954 | 4/1949 | Becker | 362/198 |
| 2,533,494 | 12/1950 | Mitchell, Jr. | 248/168 |
| 2,581,129 | 1/1952 | Muldoon | 362/184 |
| 2,648,762 | 8/1953 | Dunkelberger | 362/198 |
| 2,705,279 | 3/1955 | Berlinger | 362/197 |
| 3,103,723 | 9/1963 | Becker | 24/3.12 |
| 3,111,277 | 11/1963 | Grimsley | 362/197 |
| 3,226,667 | 12/1965 | Senior, Jr. | 439/333 |
| 3,393,311 | 7/1968 | Dahl | 362/190 |
| 3,393,312 | 7/1968 | Dahl | 362/190 |
| 3,479,499 | 11/1969 | Dahl | 362/198 |
| 3,584,822 | 6/1971 | Oram | 362/421 |
| 3,611,255 | 10/1971 | Shroyer | 439/352 |
| 3,731,084 | 5/1973 | Trevorrow | 362/108 |
| 3,852,587 | 12/1974 | Koehler | 362/197 |
| 3,961,175 | 6/1976 | Otagoshi | 362/199 |
| 3,962,678 | 6/1976 | Kurokawa | 362/275 |

(List continued on next page.)

FOREIGN PATENT DOCUMENTS

| | | |
|---|---|---|
| 7929287 | 10/1979 | Germany . |
| 117285 | 7/1918 | United Kingdom . |
| 971866 | 10/1964 | United Kingdom . |

Primary Examiner—Ira S. Lazarus
Assistant Examiner—Alan B. Cariaso
Attorney, Agent, or Firm—Barry E. Deutsch

[57] ABSTRACT

A flashlight includes a flexible core comprising a pair of conductive wires which electrically connect a source of power to a power using implement. A flexible spine surrounds the pair of conductive wires and includes a plurality of interconnected universally rotatable members. A resilient sleeve engages the outer surface of the rotatable members forming the spine. The flashlight includes a working end housing and a base housing. A first anchor connects one end of the flexible core to the base end housing and a second anchor connects the other end of the flexible core to the working end housing. The outer surface of the resilient sleeve is restrained against relative twisting or longitudinal movement with respect to each housing.

12 Claims, 8 Drawing Sheets

U.S. PATENT DOCUMENTS

| | | | |
|---|---|---|---|
| 4,023,757 | 5/1977 | Allard et al. | 248/70 |
| 4,117,535 | 9/1978 | Holt | 362/382 |
| 4,305,560 | 12/1981 | Ban | 362/418 |
| 4,437,144 | 3/1984 | Guenther | 362/275 |
| 4,495,550 | 1/1985 | Visciano | 362/189 |
| 4,533,982 | 8/1985 | Kozar | 362/183 |
| 4,733,337 | 3/1988 | Bieberstein | 362/206 |
| 4,839,599 | 6/1989 | Fischer | 324/542 |
| 4,853,965 | 8/1989 | Blonski | 248/160 |
| 4,869,552 | 9/1989 | Tolleson et al. | 248/160 |
| 4,907,137 | 3/1990 | Schladitz et al. | 362/145 |
| 4,916,596 | 4/1990 | Sharrah et al. | 362/190 |
| 4,977,489 | 12/1990 | Fung | 362/184 |
| 4,998,190 | 3/1991 | Claessen | 362/306 |
| 5,033,528 | 7/1991 | Volcani | 160/351 |
| 5,063,933 | 11/1991 | Takahashi | 248/160 |
| 5,072,347 | 12/1991 | Brunson | 362/194 |
| 5,101,333 | 3/1992 | Glassford | 362/413 |
| 5,103,384 | 4/1992 | Drohan | 362/191 |
| 5,150,710 | 9/1992 | Hall et al. | 128/653.5 |
| 5,154,483 | 10/1992 | Zeller | 362/198 |
| 5,163,752 | 11/1992 | Copeland | 362/396 |
| 5,209,562 | 5/1993 | Glassford | 362/378 |
| 5,217,297 | 6/1993 | Yuen | 362/184 |
| 5,268,826 | 12/1993 | Greene | 362/103 |
| 5,276,596 | 1/1994 | Krenzel | 362/191 |
| 5,369,556 | 11/1994 | Zeller | 362/198 |
| 5,383,633 | 1/1995 | Ellestad | 362/103 |
| 5,385,500 | 1/1995 | Schmidt | 362/189 |
| 5,398,176 | 3/1995 | Ahuja | 362/253 |

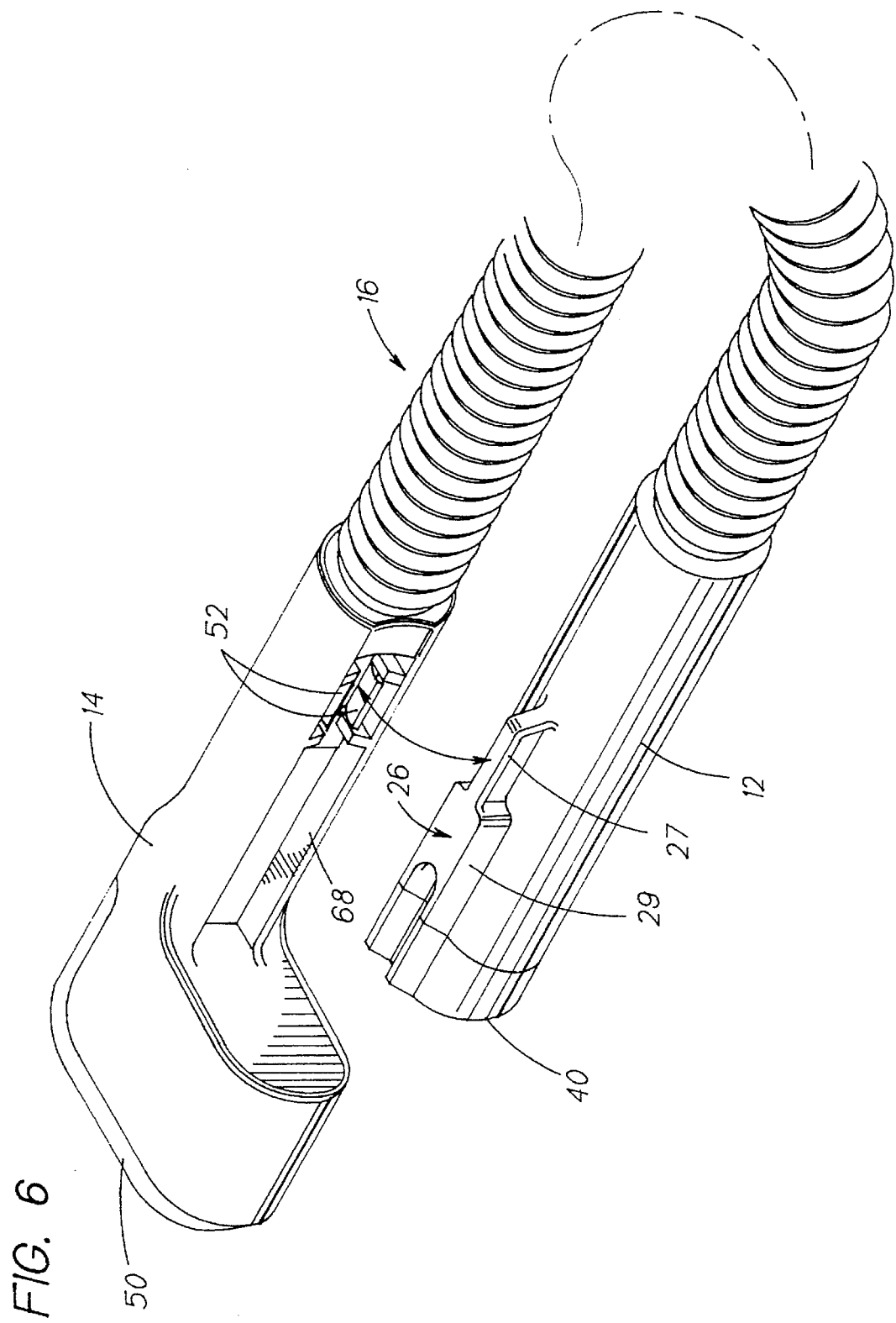

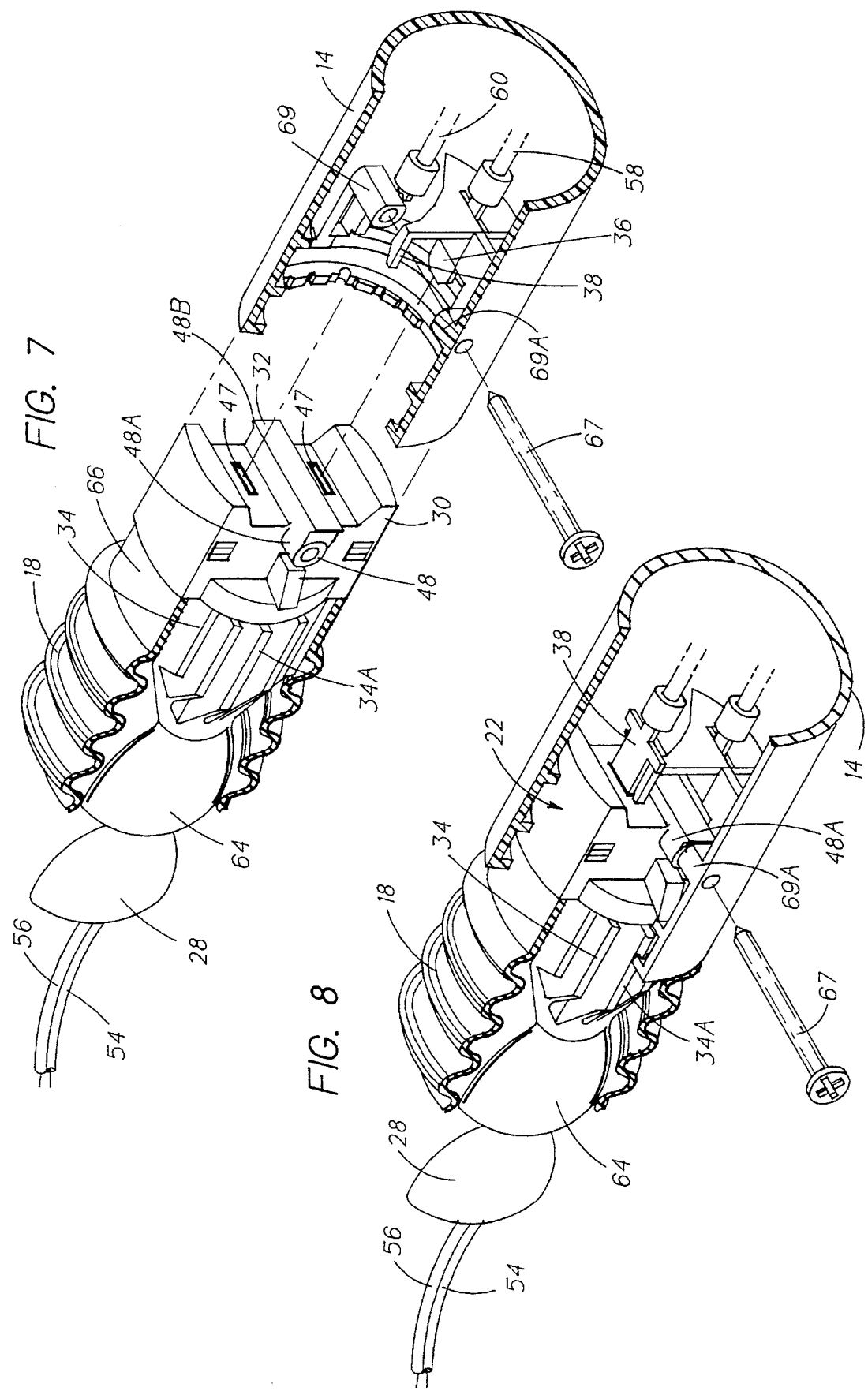

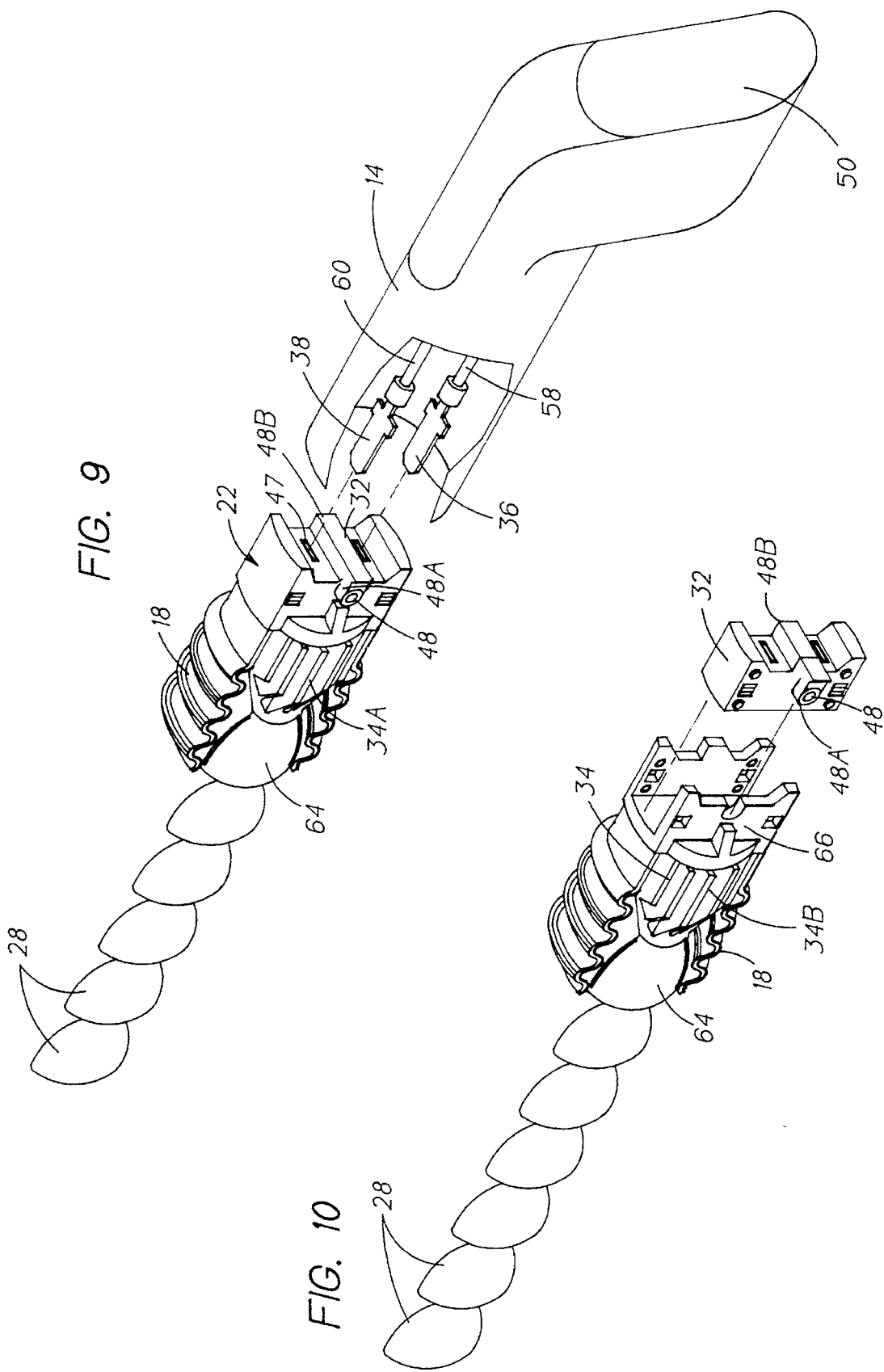

SLEEVE RETENTION FOR FLEXIBLE CORE OF A FLASHLIGHT

BACKGROUND OF THE INVENTION

This invention relates to a hand-held flashlight and in particular to such a flashlight having a flexible core which may be pulled or twisted relative to a power end housing and/or a working end housing.

In U.S. patent application, Ser. No. 08/286,313 filed concurrently herewith in the names of Lee Eckert, Robert Kubicko and Julian Watt entitled "Flashlight With Flexible Core" and assigned to the same assignee as the assignee hereof, there is disclosed a flashlight with a flexible core. In the flashlight, a pair of conductive wires electrically connect a source of power to a power using implement. A flexible spine surrounds a pair of conductive wires and includes a plurality of interconnected universally rotatable members. A resilient sleeve engages the outer surface of the rotatable members forming the spine. Each end of the spine is connected to a corresponding anchor. One anchor connects one end of the spine to the power end housing and a second anchor connects the other end of the spine to the working end housing of the flashlight.

Each of the anchors fits within a corresponding bore formed in each of the two housings of the flashlight. The opposite ends of the resilient sleeve fit over the outer surface of a corresponding anchor and are thus sandwiched between the inner surface of the bore of one of the housings and the outer surface of the anchor held within the bore.

The flexible spine of the flashlight enables the flashlight to be bent, coiled or draped into various positions. Both the torsional and pulling forces applied to the flexible spine and to the resilient sleeve as a consequence of the bending, coiling or draping of the flexible core into various positions have a tendency to separate the core from the flashlight housings.

Accordingly it is an object of this invention to prevent the resilient sleeve of a flashlight having a flexible core from being separated from the housing sections of the flashlight either through torsional or axial forces and to prevent damage to the flexible spine and internal conductors due to excessive torsional action.

SUMMARY OF THE INVENTION

The foregoing object and other objects of this invention are attained in a flashlight including a base housing forming a power end for the flashlight and having a longitudinally extending bore having at least one battery housed therein. A working end housing is spaced from the base and supports a reflector, a lens and a light bulb. The working end housing includes means defining a longitudinally extending bore. A flexible core assembly connects the base housing to the working end housing and includes a pair of conductive wires electrically connecting the battery to the light bulb, a flexible spine surrounding the pair of conductive wires and including a plurality of interconnected and universally rotatable members, and a resilient sleeve member engaging an outer surface of each of the rotatable members forming the spine. A first anchor is connected to a first end of the flexible core and has a portion extending within the bore of the base housing. The first anchor includes first gripping means underlying the sleeve of the flexible core and the base housing bore includes second gripping means overlying the sleeve of the flexible core sandwiching the sleeve between the first and second gripping means. A second anchor is connected to a second end of the flexible core and has a portion extending within the bore of the working end housing. The second anchor includes third gripping means underlying the sleeve of the flexible core and said working end housing bore includes fourth gripping means overlying the sleeve of the flexible core to sandwich the sleeve between said third and fourth gripping means.

BRIEF DESCRIPTION OF THE DRAWING

FIG. 6 is a perspective view of the flashlight in a somewhat folded position illustrating the manner in which the two housings of the flashlight may be joined together;

FIG. 7 is a perspective exploded view of a portion of the flashlight;

FIG. 8 is a view similar to FIG. 7 showing the parts in their assembled state;

FIG. 9 is an exploded perspective view of a further portion of the flashlight;

FIG. 10 is an exploded perspective view of a subassembly of the flashlight;

DESCRIPTION OF THE PREFERRED EMBODIMENT

Figure 1:
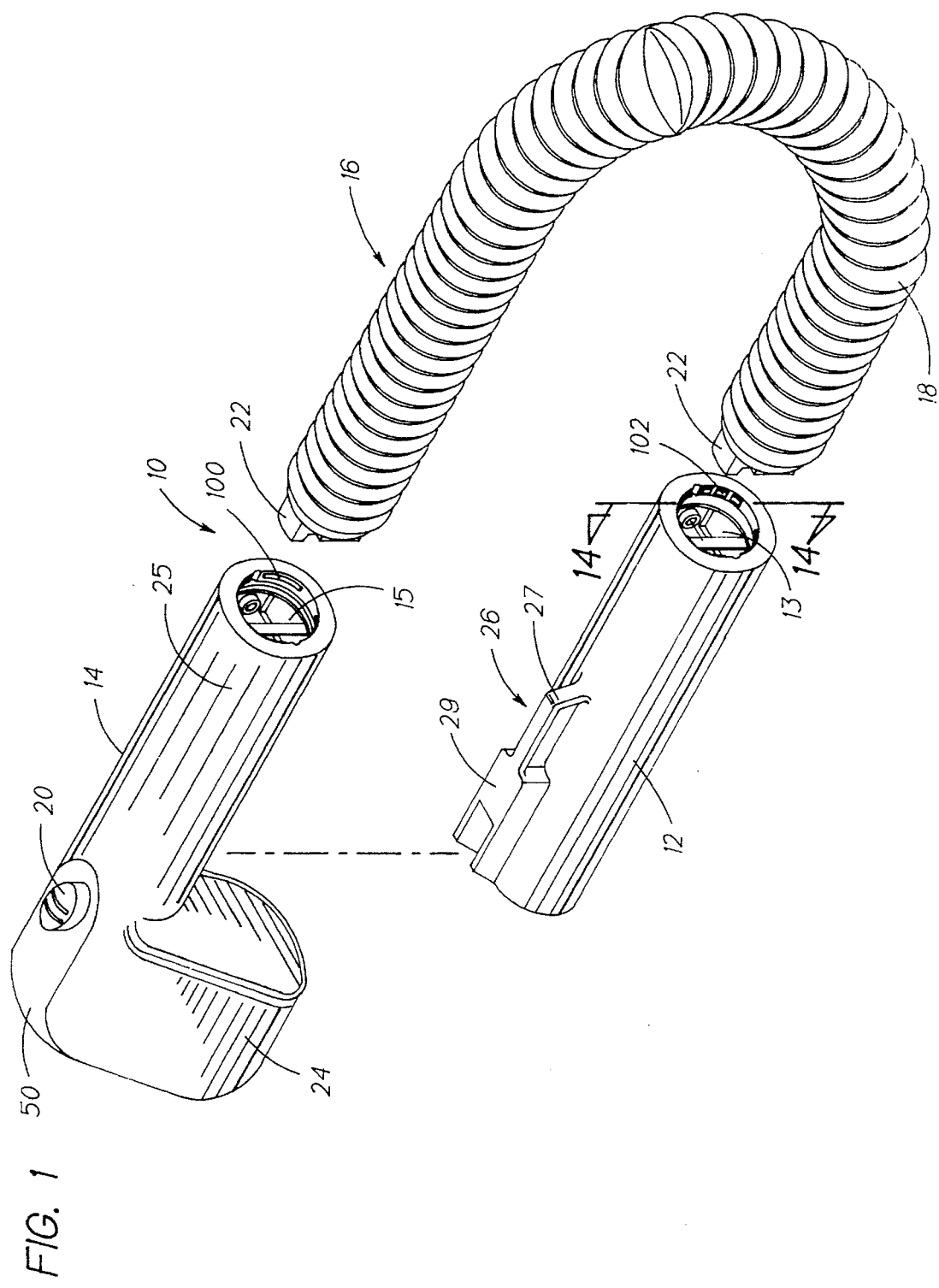
FIG. 1 is a perspective, exploded view illustrating features of the flashlight of the invention.

Referring now to the various figures of the drawing, there is disclosed a preferred embodiment of the present invention. In referring to the various figures of the drawing, like numerals shall refer to like parts.

Referring specifically to FIG. 1, there is disclosed a flashlight 10 having a first housing 12 and a second housing 14. Housings 12 and 14 are spaced apart and are connected together through a flexible core 16. Housing 12 serves as the power end of the flashlight and contains therewithin batteries 78 and 80 (see FIG. 2) used as the primary source of electrical power for the flashlight. Batteries 78 and 80 may be standard C-cells.

Figure 2:
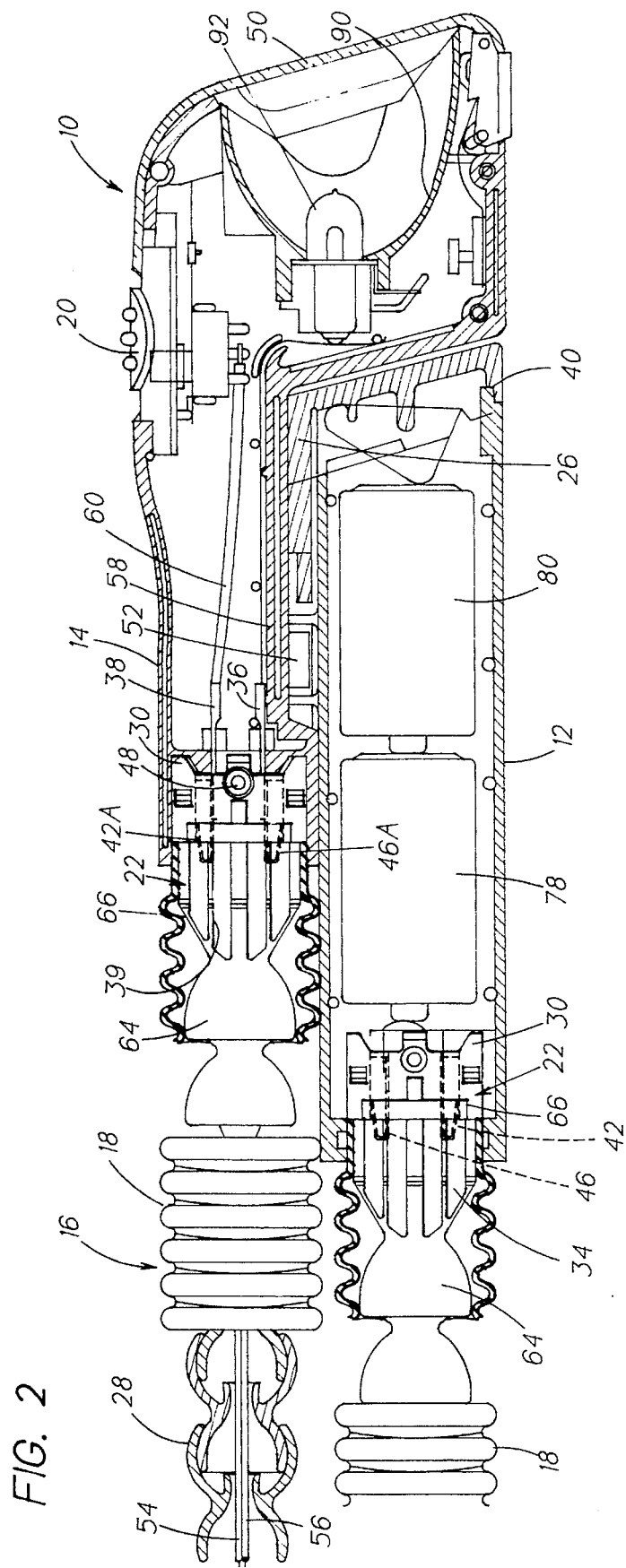
FIG. 2 is a side elevational view, partially in section, of the flashlight of FIG. 1.
Figure 3:
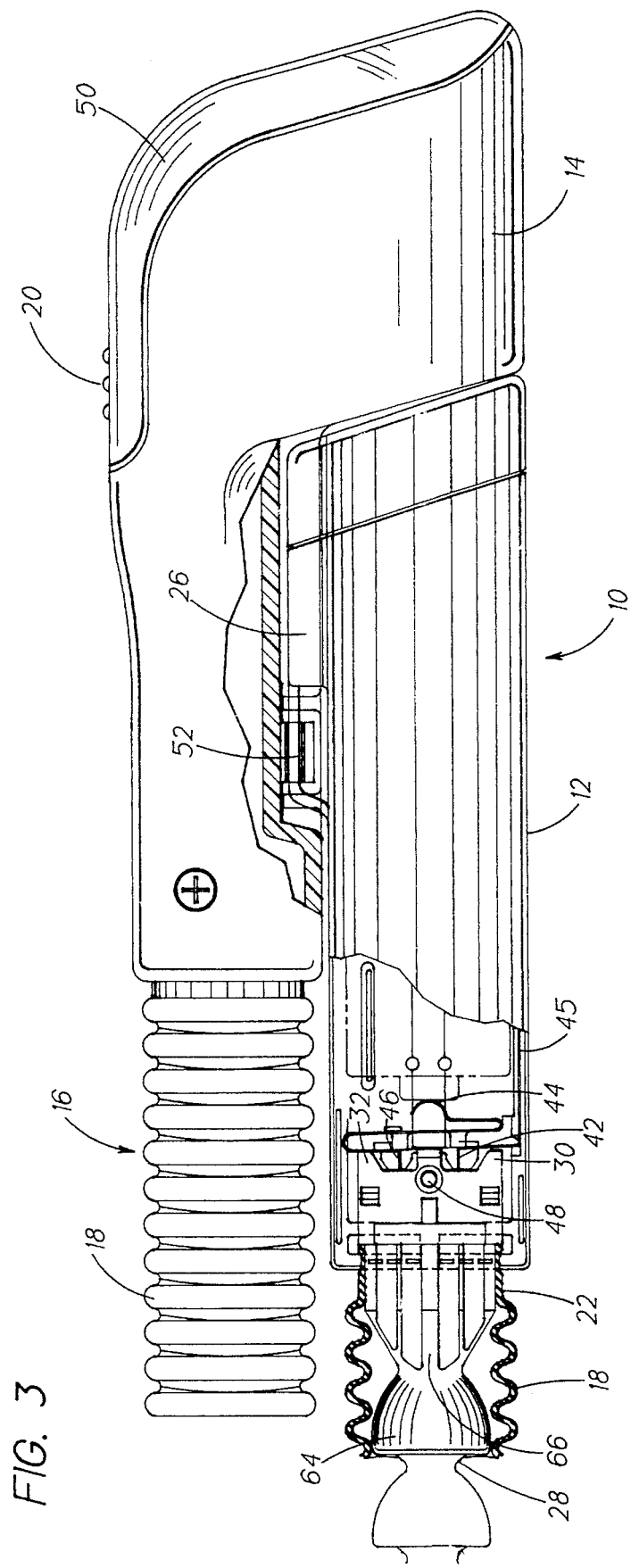
FIG. 3 is a side elevational view with portions broken away to illustrate further details of the flashlight.
Figure 4:
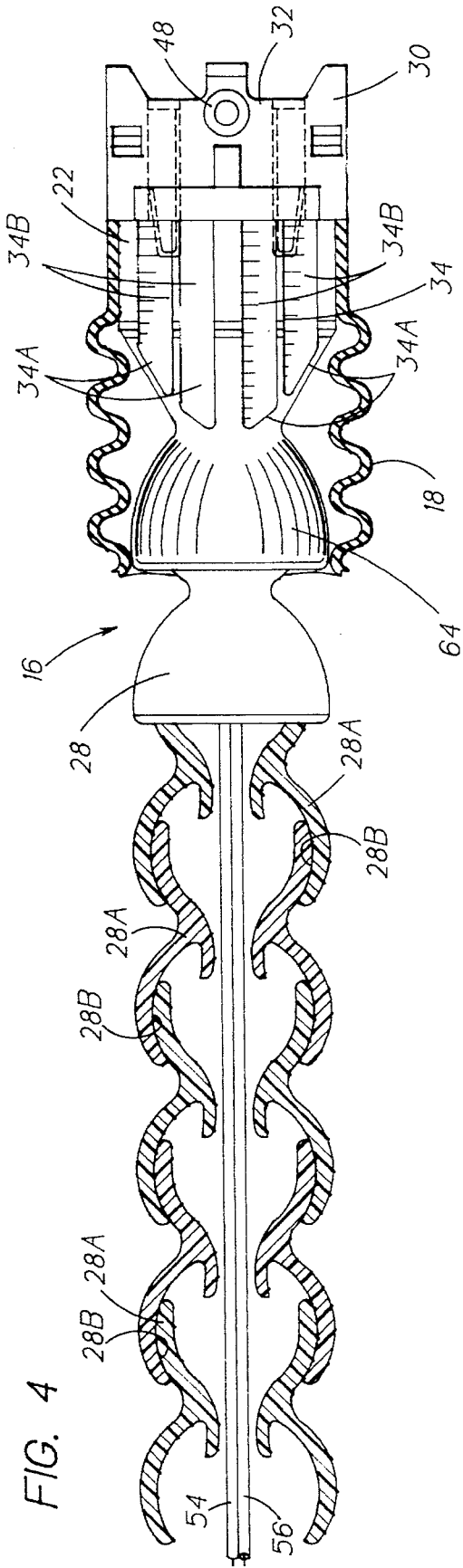
FIG. 4 is an enlarged elevational view illustrating details of a portion of the flashlight of the present invention.
Figure 5:
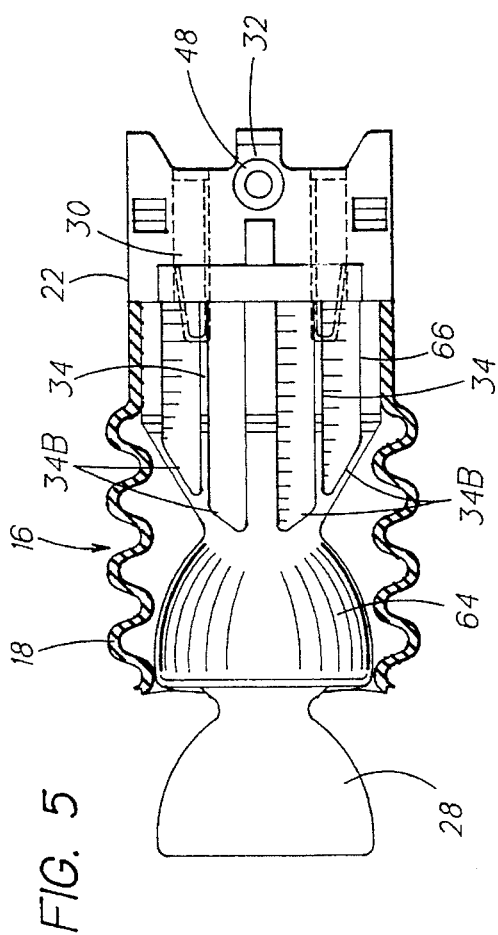
FIG. 5 is an enlarged elevational view of a further portion of the flashlight of the invention.
Figure 11:
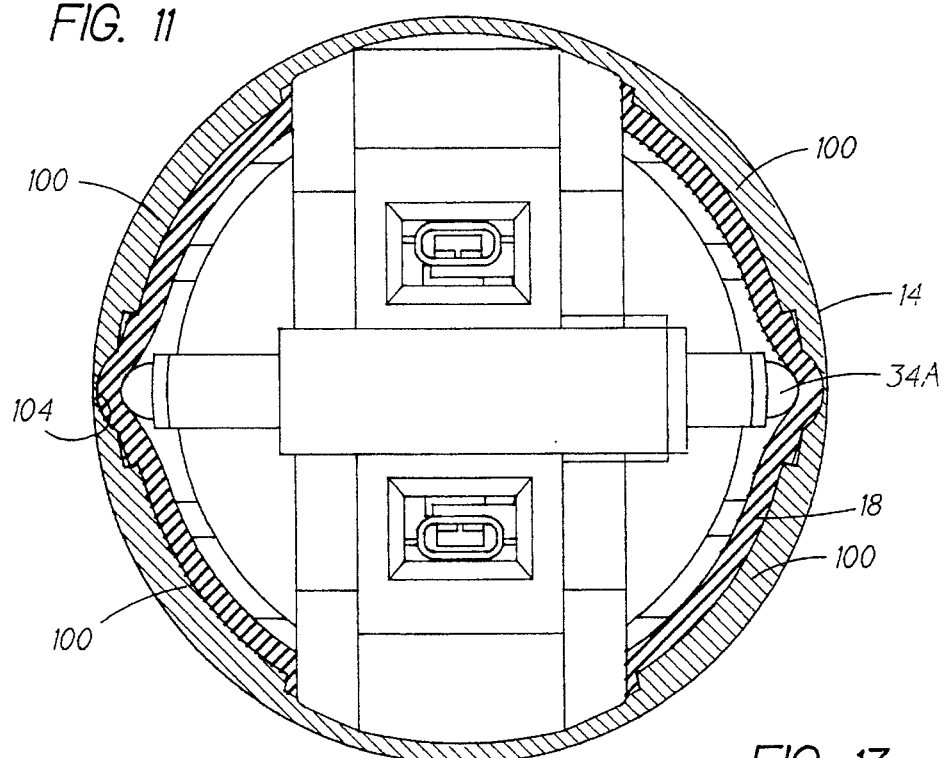
FIG. 11 is an enlarged sectional view taken along line 11—11 of FIG. 12.
Figure 12:
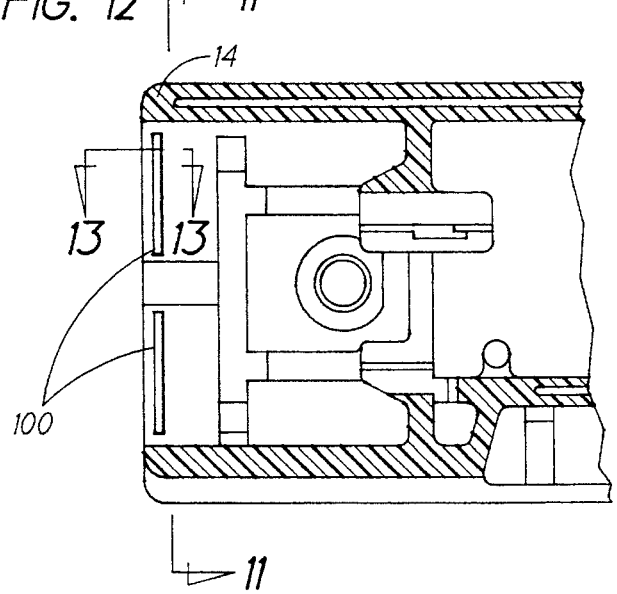
FIG. 12 is a fragmentary sectional view of a portion of one of the housings of the flashlight illustrating details thereof.

Housing 14 functions as the working end of flashlight 10 and includes a lens 50. As shown in FIG. 2, housing 14 also has mounted therewithin reflector 90 and bulb 92. A switch 20 is provided to selectively connect bulb 92 to the source of electrical power such as batteries 78 and 80.

Housing 14 is generally L-shaped and includes a generally cylindrically-shaped elongated leg 25 and a somewhat rectangularly-shaped shorter leg 24 extending from leg 25. Leg 24 mounts lens 50, reflector 90, and bulb 92.

Housing 12 includes a bore 13 and leg 25 of housing 14 includes a similar bore 15. One end of flexible core 16 is inserted into bore 15 and the other end is inserted into bore 13. Each end of core 16 has an anchor 22 to be more fully described hereinafter which is inserted into one of the bores 13, 15 for joining flexible core 18 to housings 12 and 14.

Referring primarily to FIGS. 2–10, additional features of flashlight 10 shall now be described in detail. Flexible core 16 includes an outer resilient sleeve 18 made from a resilient elastomeric material such as a thermoplastic rubber sold by the Monsanto Corporation under the trademark "Santoprene." Referring particularly to FIG. 4 a flexible spine 28 is contained within sleeve 18. Spine 28 comprises a plurality of interconnected universally rotatable members. Each universally rotatable member comprises a male end portion 28A and a female end portion 28B. The male end portion 28A has an outer surface comprising a frustum of a sphere and the female end portion 28B has a mating inner surface comprising a frustum of a sphere which is dimensioned so that, when the male end portion 28A is inserted into the female end portion 28B, there is frictional contact between the mating outer and inner surfaces 28A and 28B. These frictional forces function as retaining means to hold one member of the flexible spine 28 at any desired location relative to an interconnected member. These frictional forces may be overcome which permits interconnected members to be moved relative to each other so that their longitudinal axes may either be in or out of alignment. The interconnected segments have relatively unrestricted rotational movement therebetween. The segments of the flexible spine 28 are produced by Lockwood Products, Inc. and are made from acetal plastic or other suitable material. Electrical conductors 54 and 56 are disposed within flexible spine 28. One end of conductors 54, 56 is connected to housing 12 and the other end of the conductors is connected to working end housing 14.

Sleeve 18 provides a protective cover over spine 28. The sleeve maintains an attractive appearance of the flashlight even when the individual members of spine 28 are skewed relative to each other.

An anchor 22 is connected to each end of flexible core 16. One of the anchors is inserted into bore 13 of housing 12 and the other of the anchors is inserted into bore 15 of housing 14. Anchor 22 includes a ball portion 64, a main body portion 66 which includes a plurality of upstanding ribs 34 and a somewhat rectangularly shaped portion 30. The height of center rib 34A is somewhat greater when compared to the height of the other ribs 34 of each anchor 22. As will be more fully described hereinafter, portion 30 has an open end facing away from body portion 66 for receiving strain relief 32 therewithin. Each rib 34 includes a ramp-like leading surface 34B for expanding the material of sleeve 18 outwardly to enable each end of the sleeve to be emplaced about an anchor.

Strain relief 32 includes a pair of longitudinally spaced slots 47. Strain relief 32 mounted within housing 14 receives contacts 36, 38 in slots 47 while strain relief 32 mounted in housing 12 receives contacts 42, 46 in slots 47. The strain relief electrically connects conductors 54,56 to the contacts in each housing 12, 14. Contact 42 in housing 12 is, in turn, connected to negative strip conductor 45 while contact 42 is connected to positive conductor 44. (See FIG. 3) Conductors 44 and 45 are, in turn, connected to batteries 78 and 80. Housing 12 includes a removable battery cap 40. Contacts 36, 38 are connected to conductors 58, 60 in housing 14.

As shown, switch 20 is in series with conductor 58. As is known to those skilled in the art, switch 20 is normally open and is closed to connect bulb 92 to batteries 78, 80 via the various electrical conductors and contacts noted previously.

Referring specifically to FIGS. 1 and 6, one of the housings, for example housing 12 includes an upstanding rib 26. Rib 26 includes a relatively thin elongated portion 27 connected to a relatively wide elongated portion 29. The other of the housings, for example housing 14 includes a groove 68 whose length is generally coextensive with the length of upstanding rib 26. Groove 68 is generally U-shaped and includes a pair of spring clips 52. Spring clips 52 are placed within groove 68 in a portion which overlies relatively narrow portion 27 of rib 26. If it is desired to reduce the overall length of flashlight 10, for example, for storage purposes, or for holding the flashlight for use in a conventional hand-held manner, core 16 is folded so that the core forms a generally U-shape so that housing 12 lies in the same vertical plane as housing 14. As shown specifically in FIG. 6, when core 16 is folded as described, rib 26 underlies U-shaped groove 68. To join the two housings together, rib 26 is snapped into groove 68. Relatively narrow portion 27 of rib 26 is inserted between the opposed faces of spring clips 52 which forces the opposed faces outwardly. When the rib is inserted into the groove, the opposed faces of the spring clip are forced inwardly to lock the rib within groove 68 to positively join the two housings together.

As described previously, each end of flexible core 16 includes an anchor 22. One of the anchors is inserted into bore 13 and the other of the anchors is inserted into bore 15. During testing, it has been found that twisting or turning the flexible core to obtain a desired configuration for the flashlight produces forces which tend to pull the sleeve from either or both bores of the housings or twist either end of sleeve 18 relative to bores 13 or 15. To prevent the undesired occurrence of the separation of sleeve 18 from one or both housings and the undesired twisting of sleeve 18 relative to the housings, grasping means, to be more fully described hereinafter, have been added to both bores 13, 15 and anchors 22.

Referring specifically to FIGS. 11–14, each bore 13, 15 is provided with a plurality of circumferentially spaced inwardly extending ridges respectively 100 and 102. Ridges 100 and 102 extend radially inwardly towards the surface of sleeve 18. In addition, each bore includes a pair of 180 degree circumferentially spaced grooves 104 which underly ribs 34A when each anchor 22 is placed in a respective bore 13, 15.

Figure 13:
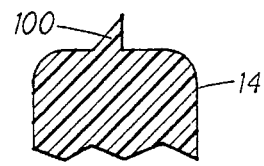
FIG. 13 is an enlarged sectional view taken along line 13—13 of FIG. 12.
Figure 14:
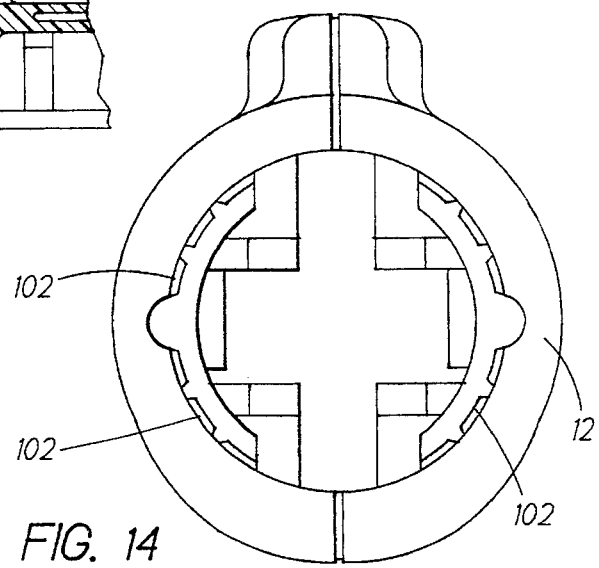
FIG. 14 is an end view taken along line 14—14 of FIG. 1.

Housing 14 includes four circumferentially spaced ridges 100 whereas housing 12 includes 12 circumferentially spaced ridges 102. The length of each ridge 100 is greater than the length of each ridge 102. As shown in FIG. 13, the cross-sectional shape of each ridge 100 (or 102) is similar to a shark's tooth so that the outer surface of the sleeve engaged by each ridge 100, 102 is firmly grasped to sandwich the sleeve between the outer surface of anchor 22 and the outer surface of each ridge. This arrangement prevents the sleeve from being twisted relative to each bore 13, 15 and prevents the sleeve from being separated from one or the other of housings 12, 14.

To further prevent any undesired twisting or longitudinal movement of the sleeve, ribs 34A act to force the resilient material of sleeve 18 into the underlying grooves 104. The combination of ribs 34A and grooves 104 further prevent twisting of sleeve 18.

A further feature of the flashlight relates to strain relief 32. Strain relief 32 includes a hub portion 48 having a relatively enlarged boss 48A formed at one end of the hub. The other end of the hub does not have an enlarged boss similar to boss 48A and the end of the hub lies in the same vertical plane relative to the vertical plane of the end face of body portion 30 of anchor 22.

Each housing 12, 14, includes a relatively large inwardly extending boss 69 and a second circumferentially spaced relatively smaller boss 69A. When each anchor 22 and its associated strain relief 32 is inserted into one of the bores 13, 15, enlarged boss 48A of strain relief 32 is aligned with relatively smaller boss 69A of the housing and the flat surface 48B of the hub is aligned with relatively large boss 69 of the housing. In effect, the strain relief can only be inserted within the bore in one position due to the relationships established by bosses 48A, 69A and 69B and the flat surface 48B of hub 48. The foregoing enables anchor 22 and strain relief 32 to be used with a polarized plug. A screw 67 or similar means is inserted through boss 69, hub 48 and boss 69A to affix each anchor 22 to its respective housing.

While a preferred embodiment of the present invention has been described and illustrated, the invention should not be limited thereto but may be otherwise embodied within the scope of the following claims.

What is claimed is:

1. A flashlight comprising:

a base housing forming a power end for said flashlight and having a longitudinally extending bore including at least one battery housed therein;

a working end housing spaced from said base housing and supporting a reflector, a lens, and a light bulb, said working end housing including means defining a longitudinally extending bore;

a flexible core assembly connecting said base housing to said working end housing and comprising a pair of conductive wires electrically connecting said battery to said light bulb, a flexible spine surrounding said pair of conductive wires and including a plurality of interconnected and universally rotatable members, and a resilient sleeve member engaging an outer surface of each of the rotatable members forming said spine;

a first anchor connected to a first end of said flexible core and having a portion extending within the bore of said base housing, said anchor including first gripping means underlying the resilient sleeve member of said flexible core, and said base housing bore including second gripping means overlying the sleeve of said flexible core and sandwiching said sleeve between said first and second gripping means; and a second anchor connected to a second end of said flexible core and having a portion extending within the bore of said working end housing, said second anchor including third gripping means underlying the sleeve of said flexible core and said working end housing bore including fourth gripping means overlying the sleeve of said flexible core and sandwiching said sleeve between said third and fourth gripping means.

2. A flashlight in accordance with claim 1 wherein said first and third gripping means comprise a radially extending rib.

3. A flashlight in accordance with claim 1 wherein each of said anchors has first locking means and each of the bores of said working end housing and said base housing includes second locking means for engaging said first locking means to maintain the flexible core in a fixed circumferential position relative to the bores of said base and working end housings.

4. A flashlight in accordance with claim 3 wherein a selected one of said first and second locking means comprises a longitudinally extending rib and the other of said locking means comprises a complementary concave surface for receiving said rib.

5. A flashlight in accordance with claim 4 wherein a selected one of said third and fourth locking means comprises a longitudinally extending rib and the other of said third and fourth locking means comprises a complementary concave surface for receiving said rib.

6. A flashlight comprising:

a base housing forming a power end for said flashlight and having a longitudinally extending bore including at least one battery housed therein;

a working end housing spaced from said base housing and supporting a reflector, a lens, and a light bulb, said working end housing including means defining a longitudinally extending bore;

a flexible core assembly connecting said base housing to said working end housing and comprising a pair of conductive wires electrically connecting said battery to said light bulb, a flexible spine surrounding said pair of conductive wires and including a plurality of interconnected and universally rotatable members, and a resilient sleeve member engaging an outer surface of each of the rotatable members forming said spine, said sleeve member including a first end extending into the bore of the base housing and a second end extending into the bore of the working end housing, each of said bores includes a plurality of inwardly extending ridges for engaging the outer surface of said sleeve.

7. A flashlight in accordance with claim 6 wherein the ridges have a shark tooth-like shape in vertical cross-section.

8. A flashlight comprising:

a base housing forming a power end for said flashlight and having a longitudinally extending bore;

a working end housing spaced from said base housing and including means defining a longitudinally extending bore;

a flexible core assembly connecting said base housing to said working end housing and comprising a pair of conductive wires electrically connecting said base housing to said working end housing, a flexible spine surrounding said pair of conductive wires electrically connecting said base housing to said working end housing, a flexible spine surrounding said pair of conductive wires and including a plurality of interconnected and universally rotatable members, and a resilient sleeve member surrounding an outer surface of each of the rotatable members forming said spine;

a first anchor connected to a first end of said flexible core and having a portion extending within the bore of said base housing, said anchor including first gripping means underlying the resilient sleeve member of said flexible core, and said base housing including second gripping means overlying the sleeve of said flexible core and sandwiching said sleeve between said first and second gripping means; and a second anchor connected to a second end of said flexible core and having a portion extending within the bore of said working end housing, said second anchor including third gripping means underlying the sleeve of said flexible core and said working end housing bore including fourth gripping means overlying the sleeve of said flexible core and sandwiching said sleeve between said third and fourth gripping means.

9. A flashlight in accordance with claim 8 wherein said first and third gripping means comprise a radially extending rib.

10. A flashlight in accordance with claim 9 wherein each of said anchors has first locking means and each of the bores of said working end housing and said base housing include second locking means for engaging said first locking means to maintain the flexible core in a fixed circumferential position relative to the bores of said base and working end housings.

11. A flashlight in accordance with claim 10 wherein a selected one of said first and second locking means comprises a longitudinally extending rib and the other of said locking means comprises a complementary concave surface for receiving said rib.

12. A flashlight in accordance with claim 11 wherein a selected one of said third and fourth locking means comprises a longitudinally extending rib and the other of said third and fourth locking means comprises a complementary concave surface for receiving said rib.

* * * * *